INVENTORS
HANS HOGEMAN
PAUL G. BURMAN
BY
Raymond A. Paquin
ATTORNEY

INVENTORS
HANS HOGEMAN
PAUL G BURMAN
BY
Raymond A. Paquin
ATTORNEY

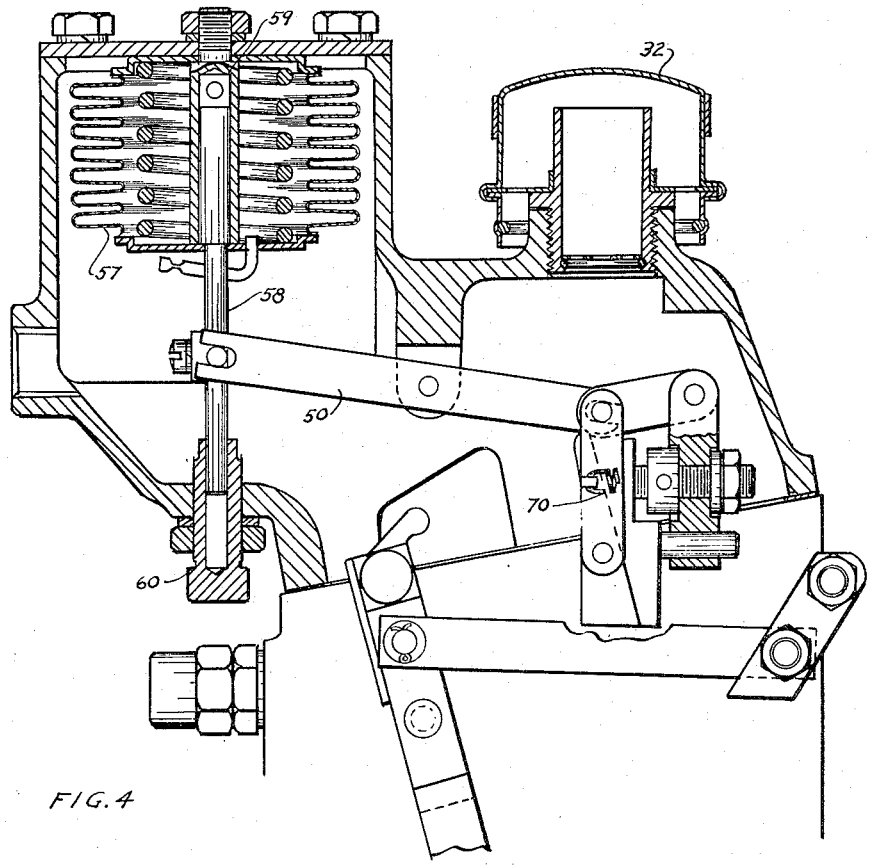
FIG.4
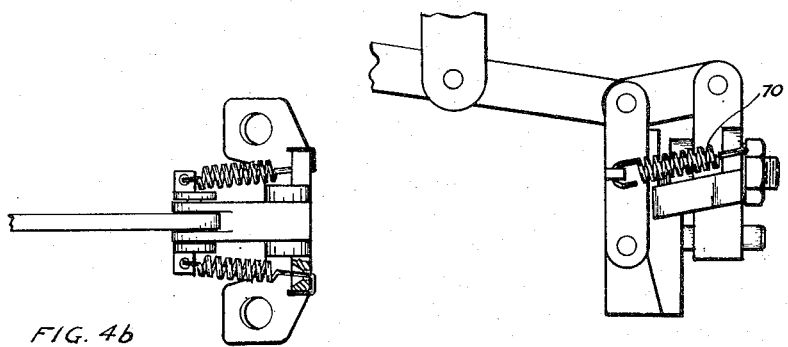
FIG.4b
FIG 4a
Inventors
HANS HOGEMAN
PAUL G BURMAN
By Raymond A. Paquin
Attorney Aug. 14, 1956   H. HOGEMAN ET AL   2,758,584
FUEL CONTROL SYSTEM Filed Oct. 3, 1951   5 Sheets-Sheet 5

Inventors
HANS HOGEMAN
PAUL G. BURMAN

Raymond A. Paquin
Attorney

United States Patent Office 2,758,584
Patented Aug. 14, 1956

2,758,584

FUEL CONTROL SYSTEM

Hans Hogeman, Longmeadow, and Paul G. Burman, Springfield, Mass., assignors to American Bosch Arma Corporation, a corporation of New York Application October 3, 1951, Serial No. 249,504

3 Claims. (Cl. 123—140)

This invention relates to fuel control device for internal combustion engines and has particular reference to apparatus for automatically compensating for changes in air supply, either altitude or manifold pressure.

An object of the invention is to provide new and improved means for compensating for changes in manifold pressure and turbo charged diesel engines.

Another object of the invention is to provide new and improved means for compensating for changes in the air supply to an engine due to changes in altitude.

The principal object of the invention is to provide fuel control mechanism for controlling the maximum fuel quantity delivered to the engine combustion chambers under certain operating conditions.

Another object and advantage of the invention will be apparent from the following description taken in connection with the accompanying drawings.

It will be understood that changes may be made in the details of construction and arrangement of parts without departing from the scope of the invention as set forth in the accompanying claims.

Referring to the drawings:

Fig. 4 is a view generally similar to Figs. 2 and 3 of a form of the device adapted for altitude compensating;

Figs. 4a and 4b are fragmentary used illustrating details of Fig. 4;

Figure 5:
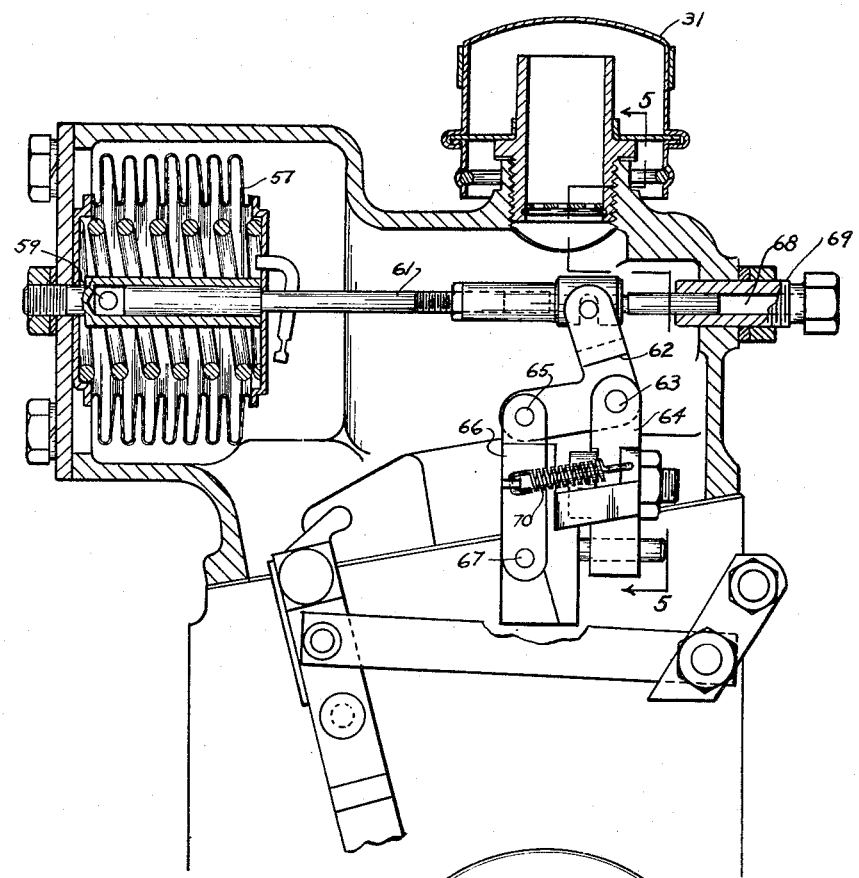
Fig. 5 is a view generally similar to Fig. 4 but showing a modified form of the altitude compensating mechanism.
Figure 5A:
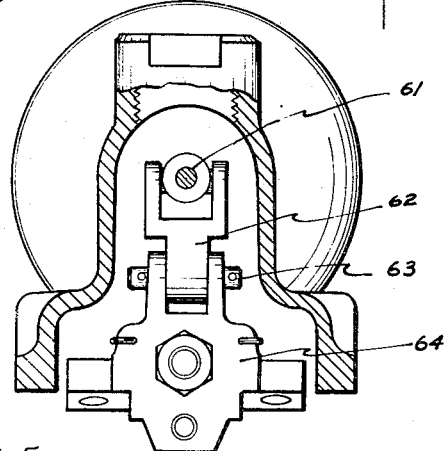
Fig. 5a is the sectional view taken along line 5—5 of Fig. 5 looking in the direction of the arrow.

The altitude compensating forms of the invention shown in Figs. 4 and 5 are intended for use with engines which may or may not be supercharged and provide an arrangement for automatically changing the maximum quantity of fuel delivered by the injection pump according with the pressure or density of the air at the altitude which the engine is in operation for automatically making such change as the engine is moved from the altitude.

Figure 1:
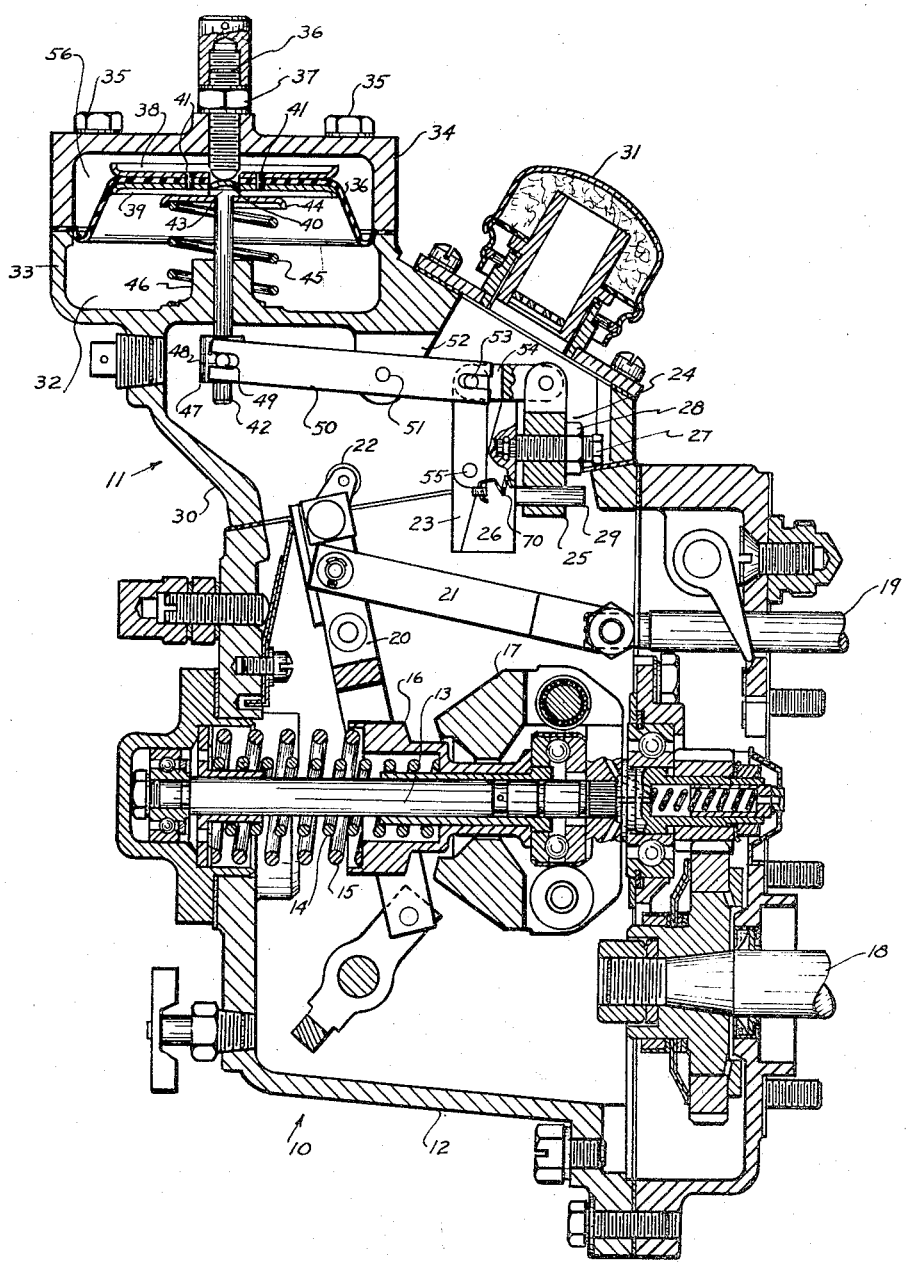
Fig. 1 is a sectional view through a governor and fuel control arrangement embodying the invention.
Figure 2:
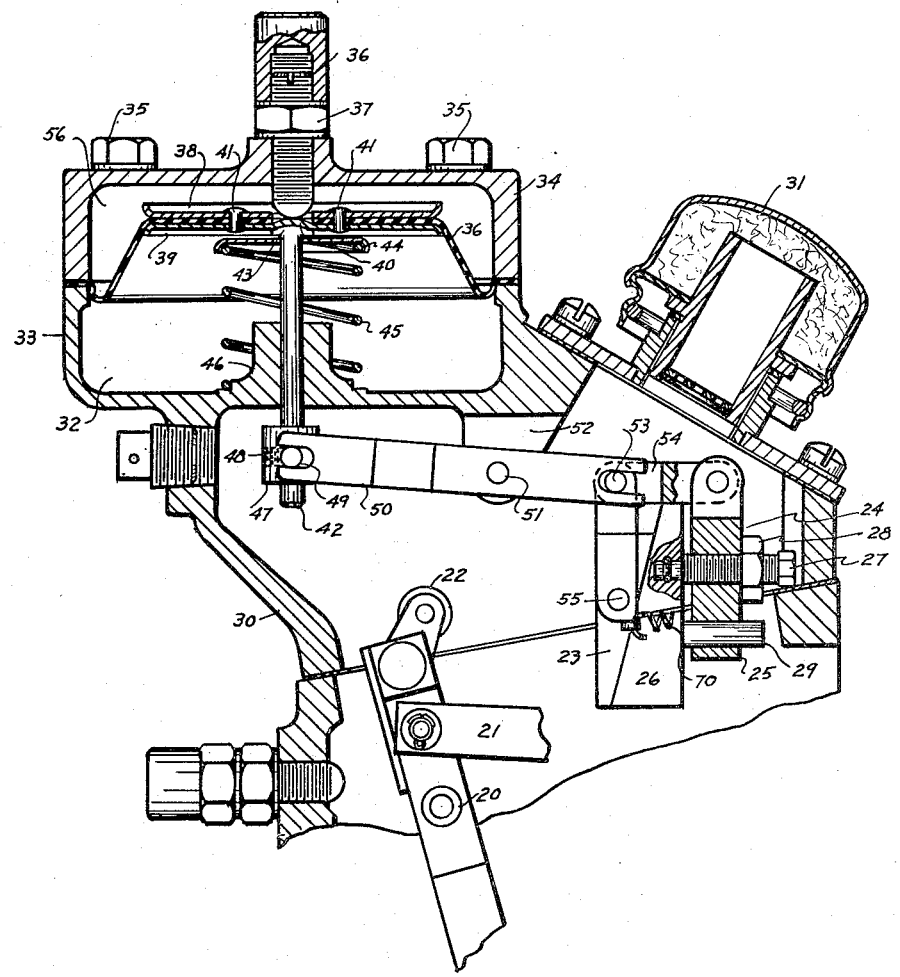
Fig. 2 is a fragmentary view of the device shown in Fig. 1 on an enlarged scale.
Figure 3:
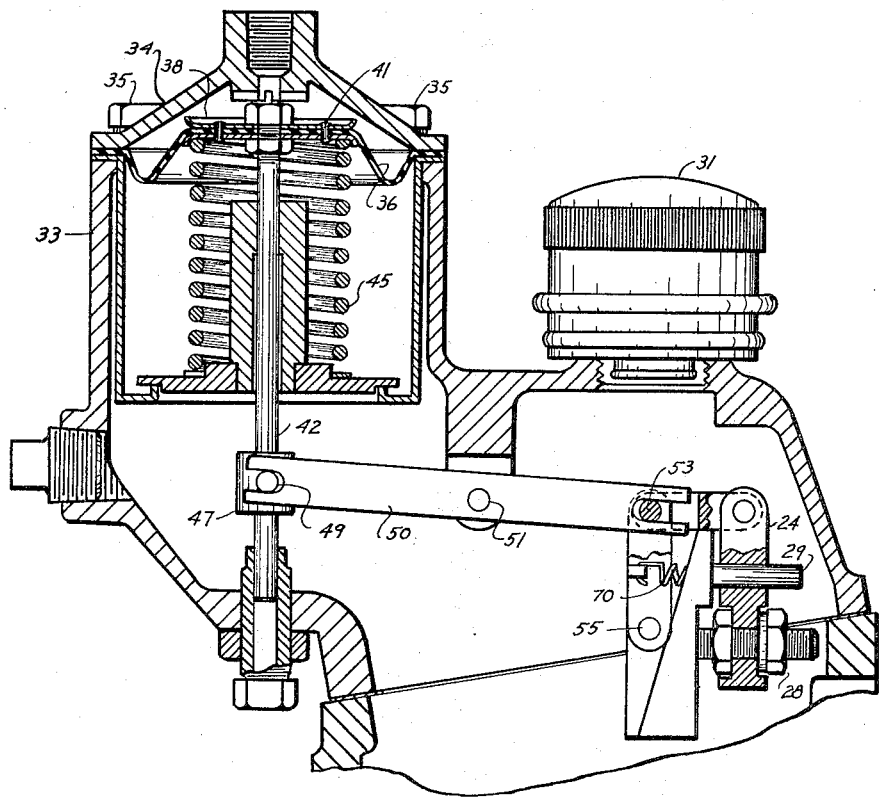
Fig. 3 is a view generally similar to Fig. 2 but showing a slightly modified form of the invention.

The form of the invention shown in Figs. 1 through 3 is intended for use with turbo charged diesel engines. When the engine speed is increased the turbo charger lags behind in speed to build up the pressure in the manifold, resulting in momentary lack of sufficient air for the increased speed. During this period the maximum fuel quantity should be decreased until the turbo supercharger has increased its speed sufficiently for the increased engine speed, otherwise the engine would use excessive fuel and would smoke. It will therefore be seen that in this form of the invention the maximum quantity of fuel delivery of the injection pump is lowered while the turbo supercharger catches up on speed and the maximum fuel delivery adjustment returned to its normal position.

It will therefore be seen from the above that the principal object of the present invention is to provide a fuel control device for internal combustion engines which adjusts the normal fuel quantity that may be fed the engine under certain operating conditions due to changes in either altitude or manifold pressure.

Referring in particular to the drawings wherein similar reference characters designate corresponding parts throughout, in the apparatus shown in Fig. 1, therefore provide the governor mechanism 10 and the compensating device 11.

The governor mechanism 10 comprises the housing 12 in which is positioned the shaft 13 on which are the governor springs 14 and 15 and the collar 16 adapted to be actuated by the centrifugal weights 17.

The governor 10 is adapted to be associated with the fuel injection pump in the usual manner as shown in Fig. 1 wherein the shaft 18 is the shaft of the fuel injection pump and 19 is the fuel control rack thereof.

The governor lever 20 is connected by the link 21 to the control rack 19 and said lever 20 is provided with the cam 22 which may or may not have the roller 9 shown, and which is adapted to engage adjustable stop 23 when the controls are set for maximum fuel delivery.

This governor assembly is generally similar to that shown in my Patent Number 2,259,693 to which reference is made for further description and explanation of the operation of the governor.

The governor is provided with an adjustable stop which consists of a bridge assembly 25 on which is supported fixed wedge 26 which is adjusted by means of adjusting screw 27 which is threaded through an opening in bridge 25 and adapted to be locked in adjustable position by lock nut 28. Aligning pin 29 extends through an opening in bridge 25 for retaining fixed wedge 26 in alignment with bridge 25.

The compensating arrangement 11 comprises the housing portion 30 which is connected to the housing 12 of the governor. The housing 30 is provided with a breather assembly 31 and has the diaphragm chamber 32 which is formed by the upstanding wall 33 on housing 30 and on wall 33 is provided cover plate 34 which is secured in operative location by means of studs 35. Diaphragm 36 has its peripheral edge positioned between flange 33 and cover 34 which retains the diaphragm 36 in operative position within chamber 32.

Within cover 34 is positioned adjustable screw 36 adapted to be locked in sufficient position by lock nut 37.

On opposite sides of diaphragm 36 are provided plates 38 and 39 with plate 38 having a central annular opening and plate 39 having a deflected center portion 40 deflected to the opening formed in plate 38. Plates 38 and 39 are secured together with diaphragm 36 and bound by means of rivets or the like 41 and rod 42 has an enlarged head 43 in the opening found between deflected portion 40 of plate 39 and is retained therein by spring seat 44 through which said rod 42 extends and which is retained in engagement therewith by means of spring 45 which has its opposite end engaging the wall of the housing surrounding boss 46 which has an opening therethrough in which rod 42 is slidably mounted and adjacent free end of rod 42 is positioned pivot block 47 which is located in adjustable position by means of lock screw 48 and is provided with pivot 49 which is mounted within a slot in the adjacent end of operating lever 50 which is pivotally mounted at 51 on boss 52 on the housing 30 and which has a slot adjacent to its opposite end in which is positioned pin 53 which extends through forked member 54 which is connected at 55 to sliding wedge 23.

The portion 56 of chamber 32 which is above diaphragm 36 is connected to manifold pressure which pressure is adapted to actuated diaphragm 36 against pressure of spring 45.

It is pointed out that adjustable screw 36 and lock nut 37 for locking said screw in adjustable position to form an adjustable stop for the maximum decrease in fuel quantity, that is, screw 36 is so adjusted or set that the position of the pump control rack, when lever 20 engages sliding wedge 23 is such that the engine will receive a fuel quantity just low enough that the engine will not smoke. Also adjusting screw 27 is so adjusted as to provide the maximum fuel under normal conditions that is at seat level when the altitude compensating means is employed or in disregard of the supercharger conditions when the turbo supercharger is employed.

In Figs. 4, 4a, 4b, and Figs. 5 and 5a, are shown arrangements for accomplishing the altitude compensation.

In both these forms of the invention the sliding wedge adjustment of the maximum fuel delivery principal is employed and the forms are generally similar to that shown in Figs. 1 through 3 except that in the arrangement of the altitude compensating an evacuated bellows 57 is employed instead of the diaphragm 36 in the manifold pressure compensating arrangement. The main difference between the construction shown in Fig. 4 and Fig. 5 is in the location and direction of operation of the bellows 57. In Fig. 4 sliding rod 58 is mounted in bore 59 in bellows 57 and its opposite end slidably mounted in a bore in bearing 60 while in the arrangement of Fig. 5, instead of pivoted lever 50 rod 61 is directly connected to link 62 which is pivotly mounted at 63 on member 64 which employs bridge 25 and said member 62 has its free end pivotly connected at 65 to member 66 which is connected at 67 to sliding wedge 23. Rod 61 is mounted for movement in bore 59 in bellows 57 and its opposite end in bore 68 in bearing 69.

In all of the forms springs 70 are provided for retaining sliding wedge 23 in engagement with fixed wedge 26.

In the operation of the forms shown in Figs. 1 through 3, the manifold pressure actuates diaphragm 36 which in turn actuates rod 42 and lever 50 which adjusts sliding wedge 23 relative to fixed wedge 26. Whereupon when the engine speed is increased and the turbo charger lags behind in speed to build up the pressure in the manifold and therefore resulting in a momentary lack of sufficient air in the engine for that increased speed, the maximum fuel quantity will be decreased until the turbo supercharger has increased its speed sufficiently for the increased engine speed thereby preventing the engine from getting excessive fuel and smoking, that is, the maximum fuel delivery of the injection pump has been changed until the supercharger catches up on its speed and delivers sufficient air to prevent smoking by the engine at maximum fuel quantity. This is provided through delay in adjustment of wedge 23 relative to wedge 26 until sufficient air is provided for greater fuel quantity.

In the operation of the forms of the invention in Figs. 4 and 5 the density of atmospheric pressure at the altitude at which the engine is being operated will adjust the longitudinal position of bellows 57 and thereby adjust the position of rods 58 or 61 and the levers will thereby adjust the relative position of slide wedge 23 to fixed wedge 26 to thereby control the maximum fuel quantity which the fuel pump is capable of delivering to the engine and thereby eliminate the possibility of the engine receiving excessive fuel and smoking.

From the foregoing it will be seen that I have provided means for obtaining all of the objects and advantages of the engine.

We claim:

1. In a fuel control device for adjusting the maximum quantity of fuel which can be delivered by a fuel injection pump to an engine, a fuel injection pump having a control member, a maximum fuel stop, a member connected to said control member for the injection pump for adjusting the position of said control member, said member being adapted to engage said maximum fuel stop to thereby limit the maximum fuel quantity delivered by the pump to the engine, said maximum fuel stop comprising a pair of relatively adjustable sliding wedge members and resilient means holding the wedged faces of said members in engagement and barometric pressure actuated means operatively connected to one of said adjustable wedge members whereby actuation of said barometric pressure actuated means will effect relative adjustment of said adjustable wedge members to thereby adjust the maximum fuel quantity delivered by the pump.

2. In a fuel control device for adjusting the maximum quantity of fuel which can be delivered by a fuel injection pump to an engine, a fuel injection pump having a control member, a maximum fuel stop, a member connected to said control member for the injection pump for adjusting the position of said control member, said member being adapted to engage said maximum fuel stop to thereby limit the maximum fuel quantity delivered by the pump to the engine, said maximum fuel stop comprising a pair of relatively adjustable sliding wedge members and evacuated bellows actuated means operatively connected to one of said adjustable wedge members whereby actuation of said evacuated bellows actuated means will effect relative adjustment of said adjustable wedge members to thereby adjust the maximum fuel quantity delivered by the pump.

3. In a fuel control device for adjusting the maximum quantity of fuel which can be delivered by a fuel injection pump to an engine, a fuel injection pump having a control member, a maximum fuel stop, a member connected to said control member for the injection pump for adjusting the position of said control member, said member being adapted to engage said maximum fuel stop to thereby limit the maximum fuel quantity delivered by the pump to the engine, said maximum fuel stop comprising a pair of relatively adjustable sliding wedge members and resilient means holding the wedged faces of said members in engagement and evacuated bellows actuated means operatively connected to one of said adjustable wedge members whereby actuation of said evacuated bellows actuated means will effect relative adjustment of said adjustable wedge members to thereby adjust the maximum fuel quantity delivered by the pump.

References Cited in the file of this patent

UNITED STATES PATENTS

| | | |
|---|---|---|
| 2,161,743 | Heinrich et al. | June 6, 1939 |
| 2,179,628 | Heinzelmann | Nov. 14, 1939 |
| 2,414,617 | Summers | Jan. 21, 1947 |
| 2,435,902 | Reggio | Feb. 10, 1948 |
| 2,485,186 | Boyle | Oct. 18, 1949 |

FOREIGN PATENTS

| | | |
|---|---|---|
| 432,839 | Great Britain | Aug. 2, 1935 |